(12) United States Patent
Melzner et al.

(10) Patent No.: US 7,655,334 B2
(45) Date of Patent: Feb. 2, 2010

(54) PROTON-CONDUCTING ELECTROLYTE MEMBRANE METHOD FOR PRODUCTION AND USE THEREOF IN A FUEL CELL

(75) Inventors: Dieter Melzner, Göttingen (DE); Suzana Kiel, Göttingen (DE); Ulrich Mahr, Berlin (DE); Annette Reiche, Göttingen (DE)

(73) Assignee: Volkswagen AG, Wolfsburg (DE)

( * ) Notice: Subject to any disclaimer, the term of this patent is extended or adjusted under 35 U.S.C. 154(b) by 713 days.

(21) Appl. No.: 10/495,222

(22) PCT Filed: Nov. 7, 2002

(86) PCT No.: PCT/EP02/12461

§ 371 (c)(1), (2), (4) Date: Dec. 22, 2004

(87) PCT Pub. No.: WO03/043116

PCT Pub. Date: May 22, 2003

(65) Prior Publication Data

US 2005/0118476 A1    Jun. 2, 2005

(30) Foreign Application Priority Data

Nov. 12, 2001 (DE) ................................ 101 55 543
Nov. 12, 2001 (DE) ................................ 101 55 545

(51) Int. Cl.
*H01M 8/10* (2006.01)
(52) U.S. Cl. ............................ 429/33; 429/12; 429/42; 429/44; 429/129; 521/27
(58) Field of Classification Search .................. 429/33, 429/12, 42, 44, 129; 521/27
See application file for complete search history.

(56) References Cited

U.S. PATENT DOCUMENTS 4,814,399 A    3/1989    Sansone et al.

(Continued)

FOREIGN PATENT DOCUMENTS

WO    WO 01/18894 A2    3/2001

(Continued)

OTHER PUBLICATIONS

Schechter et al., "Imidazole and 1-methyl imidazole in phosphoric acid doped oolvbenzimidazole, electrolvte for fuel cells". Solid State Ionics. vol. 147, 2002. pp. 181-187.*

(Continued)

*Primary Examiner*—Peter D. Mulcahy
*Assistant Examiner*—Henry Hu
(74) *Attorney, Agent, or Firm*—Sughrue Mion, PLLC (57) ABSTRACT

A proton-conducting electrolyte membrane is disclosed, comprising at least one base material and at least one dopant, which is the reaction product of an at least dibasic inorganic acid with an organic compound, comprising one acidic hydroxyl group, or the condensation product of said compound with a polybasic acid. The membrane may be produced by a single step method, which avoids the use of dangerous materials and environmental pollutants. Subsequent doping of the membrane, e.g., in conjunction with assembly of the membrane electrode assembly (MEA) is not excluded. The electrolyte membrane has a high and constant mechanical stability and flexibility, excellent chemical and thermal stability and a high and constant conductivity. The membrane may be used in a fuel cell in a wide temperature range from 50° C. to more than 200° C., for example, whereby the fuel cell has a high and constant power level over the entire temperature range.

13 Claims, 6 Drawing Sheets

U.S. PATENT DOCUMENTS 5,525,436 A    6/1996    Savinell et al.
5,945,233 A    8/1999    Onorato et al.

FOREIGN PATENT DOCUMENTS

WO    WO-01/18894 A2 *    3/2001

OTHER PUBLICATIONS

Wainright et al., "Acid Doped Polybenzimidazoles, a New Polymer Electrolyte", Proceedings of the Symposium on Electrtode Materials and Processes for Energy Conversion and Storage, May 22, 1994. pp. 255-264.*

Zukowska et al., "Nonaqueous gel electrolytes doped with phosphoric acid esters"i SolidState Ionics, vol. 144, 2001, pp. 163-173.*

* cited by examiner

PROTON-CONDUCTING ELECTROLYTE MEMBRANE METHOD FOR PRODUCTION AND USE THEREOF IN A FUEL CELL

BACKGROUND OF THE INVENTION

The present invention relates to a proton-conducting electrolyte membrane. In particular the present invention relates to a proton-conducting electrolyte membrane having a high conductivity, high mechanical and chemical stability, high flexibility and thermal stability which can be used in fuel cells over a wide temperature range. Furthermore, the present invention relates to a method of producing the proton-conducting electrolyte membrane and the use of at least one proton-conducting electrolyte membrane in the form of a membrane electrode assembly (MEA) in a fuel cell.

For a stationary and mobile electric power generation, e.g., for road vehicles, space travel, power plants, etc., fuel cells are being investigated and developed as a possible electric current source to an increasing extent. A fuel cell is a galvanic element in which chemical energy is converted directly into electric energy, i.e., not by way of thermal energy. A single cell consists of two invariant electrodes between which there is an invariant electrolyte. The fuel cell continuously supplies electric current by continuously supplying the substance that is to be oxidized, i.e., the so-called fuel, e.g., hydrogen, which is obtained by cleavage of natural gas, methanol, hydrazine, ammonia, etc., and the oxidizing agent, e.g., oxygen, and by continuously removing the oxidation products such as water.

With the beginning of use of polymer membranes as the invariant solid electrolyte, attention has been directed at proton-conducting membranes based on ionomers containing perfluorinated sulfonic acid units, e.g., perfluoroalkyl sulfonic acid polymer electrolytes. Such a membrane is available under the brand name Nafion® from DuPont, for example. Such membranes are heterogeneous systems. The hydrophilic and hydrophobic polymer building blocks form a cluster structure into which water is incorporated as a prerequisite for a high conductivity. With these heterogeneous systems, charge transport is bound to the liquid, i.e., aqueous phase. The fact that water molecules function as proton carriers in these proton conductors means that the water concentration in the cell must be kept constant. The latter is problematical because water is also produced as an oxidation product in the reaction and therefore must be removed in a controlled manner. These fuel cells also operate only at temperatures below 100° C., likewise due to the role of the water molecules as proton carriers, because at temperatures above 100° C. water is expelled from the membrane. This is associated with a decline in conductivity, which is why these membranes are limited to use in a temperature range below 100° C. (O. Savadogo et al., *Journal of New Materials for Electrochemical Systems* 1 (1998), pp. 47-66). Another problem with membrane fuel cells based on Nafion is that the catalysts used are particularly sensitive to catalyst poisons such as carbon monoxide in the temperature range below 100° C. and in general are less effective there.

U.S. Pat. No. 5,525,436 describes a solid polymer electrolyte membrane which includes a proton-conducting polymer that is thermally stable at temperatures up to 400° C. The proton-conducting polymer may be a basic polymer, preferably polybenzimidazole (PBI) doped with a strong acid, preferably sulfuric acid or phosphoric acid. When a basic polymer such as PBI is doped with a strong or stable acid such as sulfuric acid or phosphoric acid, it results in a polymer electrolyte which forms a single-phase system in which the acid is complexed by the polymer in contrast with the heterogeneous water-based systems described above in which the charge transport is bound to the liquid phase.

In the single-phase electrolyte systems described in U.S. Pat. No. 5,525,436 (also in contrast with the heterogeneous systems), commercially relevant conductivities are achieved only at temperatures above 100° C. The conductivity of the membranes depends on the phosphoric acid concentration and the doping time but does not have any mentionable dependence on the water content. The removal of acid at temperatures above 100° C. is negligible. For these reasons and because of the high oxidation stability of the polymer, PBI membranes doped with phosphoric acid as the electrolyte and separator have been developed for fuel cells in the working temperature range above 100° C., e.g., approximately 160° C.

The phosphoric acid-doped PBI membranes are produced in a two-step process with the PBI being dissolved in dimethylacetamide (DMAC) containing 2% lithium chloride (LiCl) in the first step and the solution then being converted to the form of a film by casting or spraying. After drying the film, the LiCl is extracted from the film with water, yielding an amorphous and flexible membrane as an intermediate product. In the second step, the membrane is doped with sulfuric acid ($H_2SO_4$) and/or preferably with phosphoric acid ($H_3PO_4$). The doping converts the membrane to a partially crystalline form. Therefore and in combination with the degree of doping, the mechanical load-bearing capacity of the membrane is reduced. This effect is increased by additional swelling with water, e.g., in storage of the membrane or due to uptake of water which occurs during operation of the fuel cell.

To increase the mechanical strength, it has been proposed, e.g., in WO 00/44816 that the polymer membrane of PBI, for example, be crosslinked with the help of a crosslinking agent. Although this makes it possible to increase the mechanical strength and thus partially eliminate the problem of brittleness, such crosslinked polymer electrolytes have a reduced conductivity and swellability with phosphoric acid.

The advantage of being able to use the single-phase phosphoric acid-doped PBI membranes described above at temperatures above 100° C. must be seen against a number of disadvantages. These membranes can only be produced in a two-step process, which is time consuming and also wasteful of materials and thus increases production costs. The polymer electrolyte membrane has a declining mechanical strength because of the crystallinity that is already present at the beginning and increases further and because of the high degree of doping with the dopant and this reduced mechanical strength can lead to deformation of the membrane or even its destruction. For this reason, the membrane must be stored in the absence of water before use. Furthermore, the power of a fuel cell containing such polymer electrolyte membranes and operated at a temperature below 100° C. declines over time because the membrane takes up water in this temperature range, which dilutes the acid (e.g., phosphoric acid) and washes it out.

To simplify the two-step production process, U.S. Pat. No. 5,716,727 describes a process for producing PBI membranes doped with phosphoric acid. A solution consisting of PBI, phosphoric acid and trifluoroacetic acid as the solvent is prepared and processed to yield a membrane by casting and evaporating the solvent.

Although this method makes it possible to produce a phosphoric acid-doped PBI membrane in a single step, this method also has some serious disadvantages. First, the resulting membrane also has an initial crystallinity which increases further and therewith brittleness with all the disadvantages described above. A significant disadvantage of this method, however, is the necessity of using trifluoroacetic acid. Trifluoroacetic acid is highly volatile, extremely aggressive and toxic and has a low flash point. Therefore this process can be carried out only in closed systems using stringent safety measures. At any rate, the proposed method causes a great deal of environmental pollution, however, because of the trifluoroacetic acid which is difficult to dispose of.

SUMMARY OF THE INVENTION

Therefore, one object of the present invention is to provide a proton-conducting electrolyte membrane which does not have the disadvantages of the electrolyte membranes known in the state of the art. In particular it should provide a proton-conducting electrolyte membrane which has a high constant conductivity, a high mechanical stability and flexibility and an excellent chemical and thermal stability and can be used in a wide temperature range from below 100° C. up to 200° C. in fuel cells.

Another object of the present invention is to provide a simple method with which the inventive proton-conducting electrolyte membrane can be produced inexpensively and in an environmentally safe manner.

Finally, another object of the present invention is to make available a fuel cell which contains the inventive proton-conducting electrolyte membrane.

These objects are achieved by the subjects defined in the claims.

DETAILED DESCRIPTION OF THE INVENTION

This invention is based on the finding that a proton conducting electrolyte membrane which is a single phase system and has a high mechanical stability and flexibility, excellent chemical and thermal stability and a high constant conductivity which can be used in a wide temperature range from approximately room temperature up to 200° C. in fuel cells can be manufactured easily in a one-step process without the use of problematical starting materials, and this can be accomplished by dissolving at least one base material or a mixture of base materials together with at least one dopant and optionally a cross linking agent in a solvent, whereby the dopant is the reaction product of an at least dibasic inorganic acid with an organic compound, whereby the reaction product has an acidic hydroxyl group (not reacted), then the solution is converted into the form of a film and next the solvent is removed, e.g., by evaporating, thus yielding the inventive doped proton-conducting electrolyte membrane.

The solution used to produce the electrolyte membrane according to this invention has excellent film-forming properties. This permits machine drawing of the solution with no problem, which is often used in the production of films and/or membranes, thus making it possible to obtain a very uniform membrane.

Furthermore, the present invention provides a method of producing a proton-conducting electrolyte membrane with which in a single step a ceramic material as a base material (which is known to those skilled in the art in the field of fuel cell technology) or a mixture of ceramic materials (or a mixture of ceramic materials and a polymer material as the base material is impregnated and/or wetted and/or soaked with a dopant which is the reaction product of an at least dibasic inorganic acid with an organic compound, whereby the reaction product has an acidic hydroxyl group (not reacted) and the solvent is removed.

Since water is not needed in the production or in use of the membrane as intended for proton conduction and since the dopant does not contain water and is not water-soluble nor does it take up water (i.e., it is not hygroscopic), the membrane which constitutes a single-phase system is amorphous and retains its excellent stability and flexibility because it does not contain any substances such as $H_3PO_4$ which would lead to the development and progress of crystallinity. Since the dopant as mentioned is neither water-soluble nor hygroscopic, no special measures are needed to exclude water during storage and the membrane can be stored for a long period of time under normal conditions with no problems and without any change in its film properties. Moreover, the dopant in the electrolyte membranes according to this invention functions as a plasticizer. There is no dilution during operation of the fuel cell because of the water produced in the process likewise because of the insolubility of the dopant in water and thus the dopant is not expelled from the membrane. This has the result that the membrane retains its high conductivity over a long period of time so that the fuel cell can be operated at a constant high power over a long period of time, and in addition the fuel cell can even be operated over a wide temperature range, e.g., between approximately 20° C. and approximately 200° C., preferably between approximately 50° C. and approximately 200° C. and especially preferably between approximately 140° C. and approximately 180° C. or even above 200° C.

In traditional single-phase PBI membranes doped with phosphoric acid, for example, for fuel cells, it is necessary to add the dopant in a molar excess in the polymer which forms the membrane. Thus for example U.S. Pat. No. 5,525,436 discloses a concentration of the dopant (sulfuric acid and/or phosphoric acid) of at least 200 mol % up to 470 mol % acid, i.e., 1 to 3.7 molecules of acid for each polymer repeating unit.

This is another substantial advantage of the inventive electrolyte membrane in which an excellent conductivity of the electrolyte membrane and a resulting high power of the fuel cell can be achieved with a much lower concentration of the dopant. In the inventive electrolyte membrane, a concentration of approximately 10 wt % up to approximately 40 wt %, preferably approximately 20 wt % up to approximately 40 wt %, based on the total weight of the dried and doped membrane, results in an excellent and constant power of the fuel cell. Surprisingly, the power of the fuel cell can be increased even further if the concentration of the dopant is reduced to less than 30 wt %, preferably to approximately 20 wt %. The reduced concentration of the dopant combined with the fact that the free acid is not used as the dopant according to this invention but instead a reaction product of a polybasic (strong) inorganic acid with an organic compound, e.g., a diester of a phosphoric acid is used, results in a longer lifetime of the membrane in the fuel cell.

According to the present invention, one or more polymers and/or one or more ceramic materials may be used as the base material for the proton-conducting electrolyte membrane.

Preferably because of their excellent resistance to oxidation and because of their high thermal stability, basic polymers are used. Suitable basic polymers include polybenzimidazole, polypyridine, polypyrimidine, polyimidazoles, polybenzothiazoles, polybenzoxazoles, polyoxadiazoles, polyquinoxalines, polythiadiazoles and poly(tetrazapyrenes) or a combination of two or more thereof.

According to this invention, basic polymers having the general formula given below are especially preferred:

X = NH, NR$^1$, O, S
Z = O, S where R:

or a divalent linkage group such as a linear or branched, substituted or unsubstituted optionally perfluorinated hydrocarbon group and R$^1$ may be for example a substituted or unsubstituted alkyl, aryl or heteroaryl group or heterocyclic group.

A basic polymer according to this invention, in which Z=O, X=NH and R=a 1,2-phenylene group, a 1,3-phenylene group or a 1,4-phenylene group is also preferred.

Polybenzimidazole (PBI) having the following formula is preferred according to this invention:

If the mechanical strength of the electrolyte membrane is to be further increased or if a polymer having a relatively low molecular weight is used, then a crosslinking agent may be added to the solution used to prepare the membrane. In principle all compounds having at least two functional groups may be used here if they are capable of reacting with the polymer(s) used to form covalent bonds. Compounds having at least two epoxy groups in the molecule are preferred. An especially preferred crosslinking agent in the electrolyte membranes according to this invention, in particular those based on PBI, is 1,4-butanediol diglycidyl ether.

The crosslinking agent may be added, if desired, in an amount of 1 wt % to 30 wt %, preferably 10 wt % to 30 wt %, especially preferably 20 wt % to 30 wt %, based on the total weight of the polymer and/or basic polymer and crosslinking agent. The required amount of crosslinking agent depends on the molecular weight of the polymer used.

Essentially all solvents in which the polymer(s) is/are dissolved may be used as the solvent for the solution used to produce the electrolyte membrane. The solvent is preferably selected from the group comprising N-methyl pyrrolidone (NMP), dimethyl formamide (DMF), dimethyl sulfoxide (DMSO), dimethyl acetamide (DMAc) and mixtures thereof, but dimethyl acetamide is especially preferred.

The concentration of the polymer(s) in the solution is in the range of 10 wt % to 50 wt %, preferably 20 wt % to 40 wt % and even more preferably 25 wt % to 35 wt %, based on the weight of the finished solution used to produce the membrane. The concentration depends on the type of polymer(s) and its/their molecular weight and solubility in the respective solvent or solvent mixture and the amount of crosslinking agent.

The dopant for the inventive proton-conducting electrolyte membrane is the reaction product of a strong, at least dibasic inorganic acid and an organic compound which is capable of forming covalent bonds with the inorganic acid.

Preferably phosphoric acid or sulfuric acid is used as the acid, but phosphoric acid is especially preferred.

The organic compound which is reacted with the inorganic acid is selected from the group comprising linear or branched optionally substituted aliphatic alcohols with 5 to 20 carbon atoms, preferably 6 to 16 carbon atoms, more preferably 7 to 12 carbon atoms and most preferably 8 to 10 carbon atoms, optionally substituted aromatic alcohols, linear or branched optionally substituted aliphatic amines with 5 to 20 carbon atoms, preferably 6 to 16 carbon atoms, more preferably 7 to 12 carbon atoms, most preferably 8 to 10 carbon atoms, and aromatic amines.

Of the organic compounds, 2-ethylhexanol and phenol are especially preferred for the reaction with the inorganic acid preferably phosphoric acid.

The reaction of the at least dibasic inorganic acid with the organic compound is to be performed in such a way that an acidic OH group, i.e., a hydroxyl group of the inorganic acid remains unreacted. In the case of a tribasic acid such as phosphoric acid, two of the acidic OH groups may be bridged by an organic compound with two functional groups, e.g., by a diol, i.e., forming a ring, e.g., by esterification.

The preferred dopants according to this invention include phosphate diesters such as di-(2-ethylhexyl) phosphoric acid ester and diphenyl phosphoric acid ester, but di-(2-ethylhexyl) phosphoric acid ester is the most preferred.

The solution for producing the electrolyte membrane contains the dopant in a concentration of approximately 1 wt % to approximately 20 wt %, preferably approximately 3 wt % to approximately 15 wt %, more preferably approximately 3 wt % to approximately 12 wt %, based on the total weight of the solution used to produce the membrane. This results in a dopant concentration in the dried electrolyte membrane of approximately 10 wt % to approximately 40 wt %, preferably approximately 20 wt % to approximately 40 wt %, especially preferably approximately 20 wt % to approximately 30 wt %, based on the total weight of the dry and doped membrane. The dopant used according to this invention should be as resistant as possible to oxidative attack. Furthermore the dopant may be soluble in water only to a negligible extent, i.e., it must not dissolve more than approximately 3 wt % in water, preferably no more than approximately 2 wt %. It is most preferable for the dopant to be practically insoluble in water.

The proton-conducting electrolyte membranes according to this invention can be produced by the following method.

The base material which is in the form of one or more porous planar structures (or planar material or planar formed body) consisting of, for example, one or more polymers and/or one or more ceramic materials or a mixture of one or more polymers and one or more ceramic materials is treated with a dopant, which is absorbed by the porous planar structure (or planar material or planar formed body) as an impregnating agent. In a preferred embodiment, a powdered ceramic material is dispersed as one of the base materials in a liquid and the dispersion is mixed with one or more polymers as additional base materials. Then the polymers are optionally dissolved at an elevated temperature and a dopant is added. It is advantageous if the liquid is at the same time a solvent for the polymers. The resulting dispersion with the dissolved polymers and the dopant is then applied to a flat substrate or subjected to machine drawing to convert it into the form of a film, the solvent is removed and the resulting membrane is optionally dried at an elevated temperature.

In an especially preferred embodiment, the base material, e.g., a polymer and/or a mixture of two or more base materials, e.g., polymers is dissolved in the solvent at an elevated temperature. Then, while stirring, the crosslinking agent is added and next, the dopant is added. The homogeneous solution optionally obtained after filtration is converted to the form of a film by suitable means, e.g., by casting onto a flat (planar) substrate or by machine drawing. Then the solvent is removed and the resulting membrane is optionally dried at an elevated temperature.

The resulting electrolyte membrane has a thickness in the range of approximately 10 μm to approximately 200 μm, preferably approximately 20 to approximately 100 μm and more preferably from approximately 30 to approximately 80 μm.

The present invention is explained in greater detail by the following examples which do not restrict the scope of the invention. Percentage amounts are based on weight unless otherwise indicated.

EXAMPLES

Example 1

Production of a Doped Polymer Membrane:

Fifteen grams of polybenzimidazole (PBI) with an intrinsic viscosity* of 0.4 dL/g is dissolved in 35 g N,N-dimethyl acetamide (manufacturer: Sigma Aldrich) by boiling at reflux for two hours at a temperature of 170° C. The solution is mixed while stirring with 5 g butanediol diglycidyl ether and then with 5 g di-(2-ethylhexyl) phosphoric acid ester. Next the solution is heated for 15 minutes at 80° C. to obtain a homogeneous solution. After filtration and degassing of the solution, membranes are produced on glass sheets using a doctor blade and then dried for one hour at 80° C., 120° C. and 150° C. The membranes can be removed easily from the glass sheet and used to construct a membrane electrode assembly (MEA).

*The viscosity was determined by means of a 1 wt % solution of PBI in N,N-dimethyl acetamide. From this intrinsic viscosity, an average molecular weight of the PBI of 16,000 g/mol can be calculated by using the Mark-Houwink equation.

A membrane produced as described above has an average thickness of 55 μm and is doped with 20 wt % di-(2-ethylhexyl) phosphoric acid ester, based on the total weight of the dried membrane.

Example 2

Figure 1:
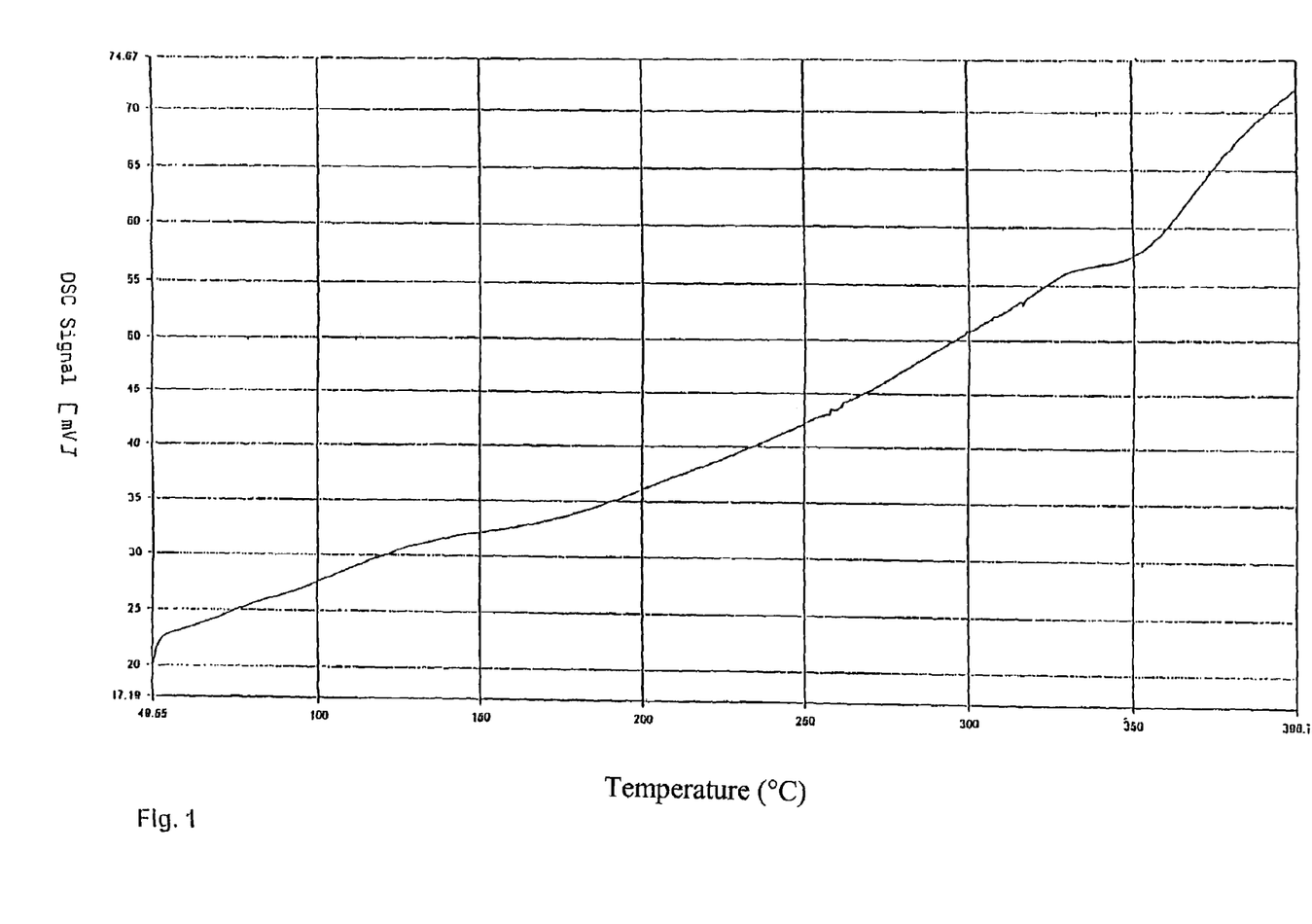
FIG. 1 is a thermogram of the membrane produced according to Example 1.

Characterization of the Membrane:

The membrane produced according to Example 1 is completely amorphous in the temperature range investigated as shown in FIG. 1. The thermogram (FIG. 1) was recorded with a Perkin Elmer DSC (differential scanning calorimeter). The heating rate was 20 K/min.

Figure 2:
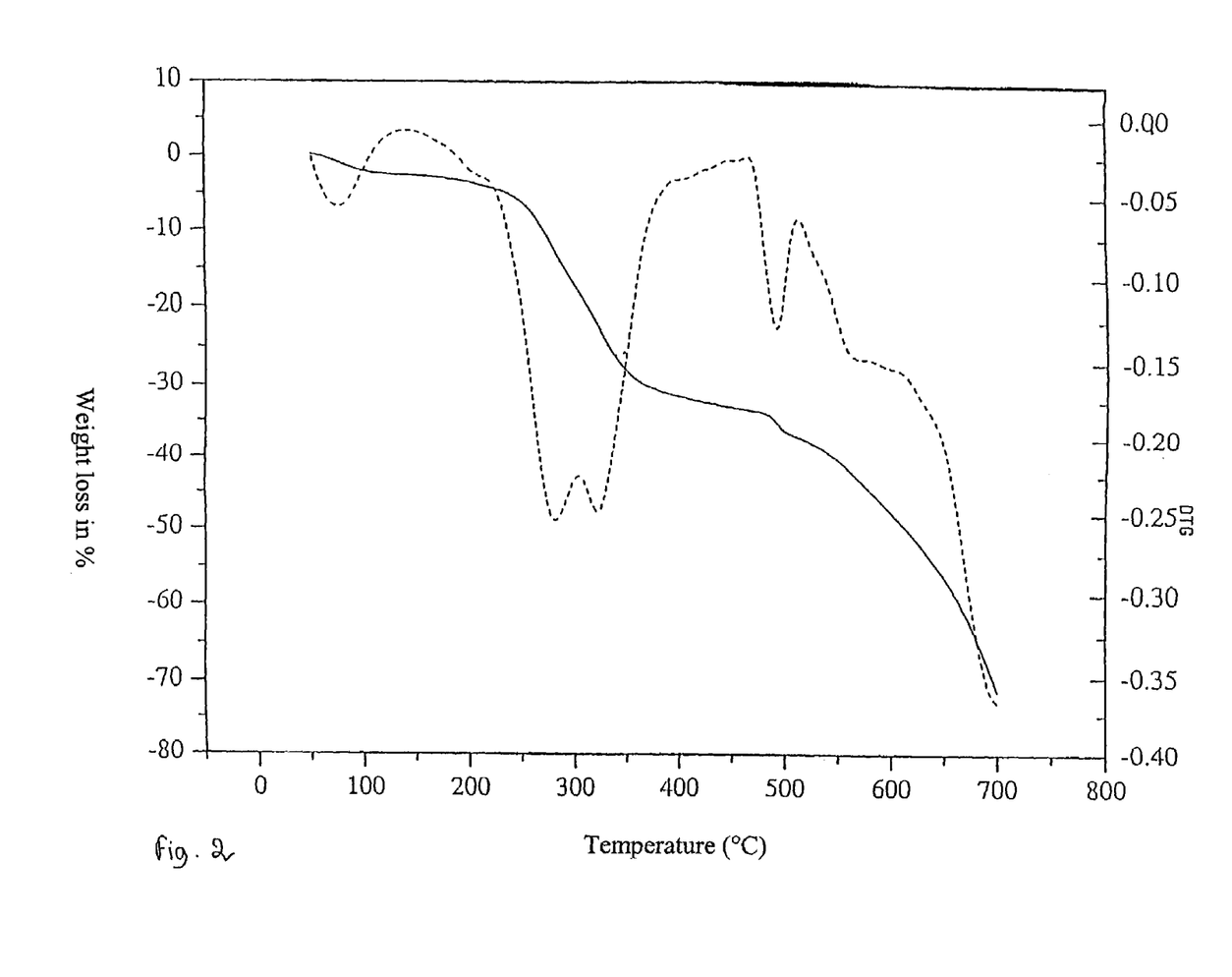
FIG. 2 depicts results of the thermogravimetric measurement.

The thermal stability of the membrane was determined by TG measurements (thermogravimetric measurements) using a Netzsch TG-209. The heating rate was 10 K/min. Results of the thermogravimetric measurement are depicted in FIG. 2. A significant weight loss can be observed only at temperatures above 250° C. The mechanical stability of the membrane was determined by rupture pressure measurements using an instrument designed by the Sartorius company in-house. The rupture pressure for the membranes tested was >1.5 bar.

Example 3

Producing a Membrane Electrode Assembly (MEA):

For the production of a membrane electrode assembly (MEA), a membrane produced according to Example 1 is cut into square pieces measuring approximately 61 cm². Commercially available ELAT electrodes with 2.0 mg/cm² Pt coverage and an area of 10 cm² from the company E-TEK are impregnated in vacuo with concentrated phosphoric acid at room temperature and then installed with a membrane according to this invention in a conventional arrangement in the test fuel cell from the company Fuel Cell Technologies, Inc. The cell is sealed with a contact pressure of 30 MPa. At 160° C. and 3 bar hydrogen pressure and air pressure, a maximum power density of 0.6 W/cm² and a current density of approximately 1.7 A/cm² are obtained. Unmoistened gases are used.

Example 4

Figure 3:
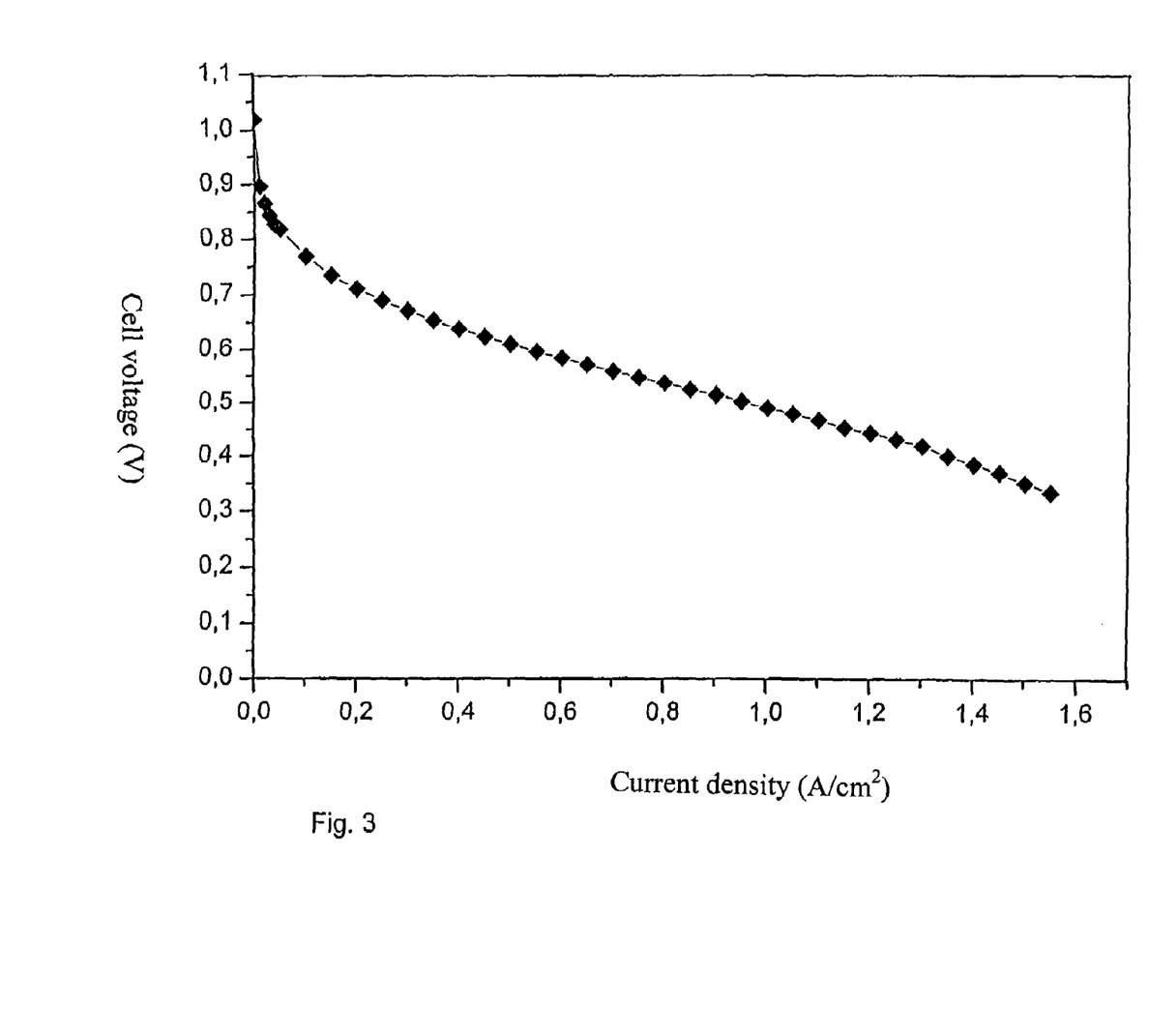
FIG. 3 shows the plot of a current-voltage curve for an MEA produced according to Example 3 at 160° C.

Power Parameters at 160° C.:

FIG. 3 shows the plot of a current-voltage curve for an MEA produced according to Example 3 at 160° C. The gas flow for $H_2$ was 170 mL/min and for air was 570 mL/min. The power parameters were determined on an FCATS Advanced Screener from Hydrogenics Corporation, Canada.

The conductivity of the membrane in the MEA was 0.57 S/cm, measured with an IM6 impedance spectrometer from the ZAHNER-elektrik GmbH & Co. KG.

The $H_2$ permeability through the membrane was 0.036 $m^3{}_N/(m^2 \cdot h \cdot bar)$ at 160° C., measured with an $H_2$ sensor from Dräger Safety AG & Co. KGaA.

Example 5

Figure 4:
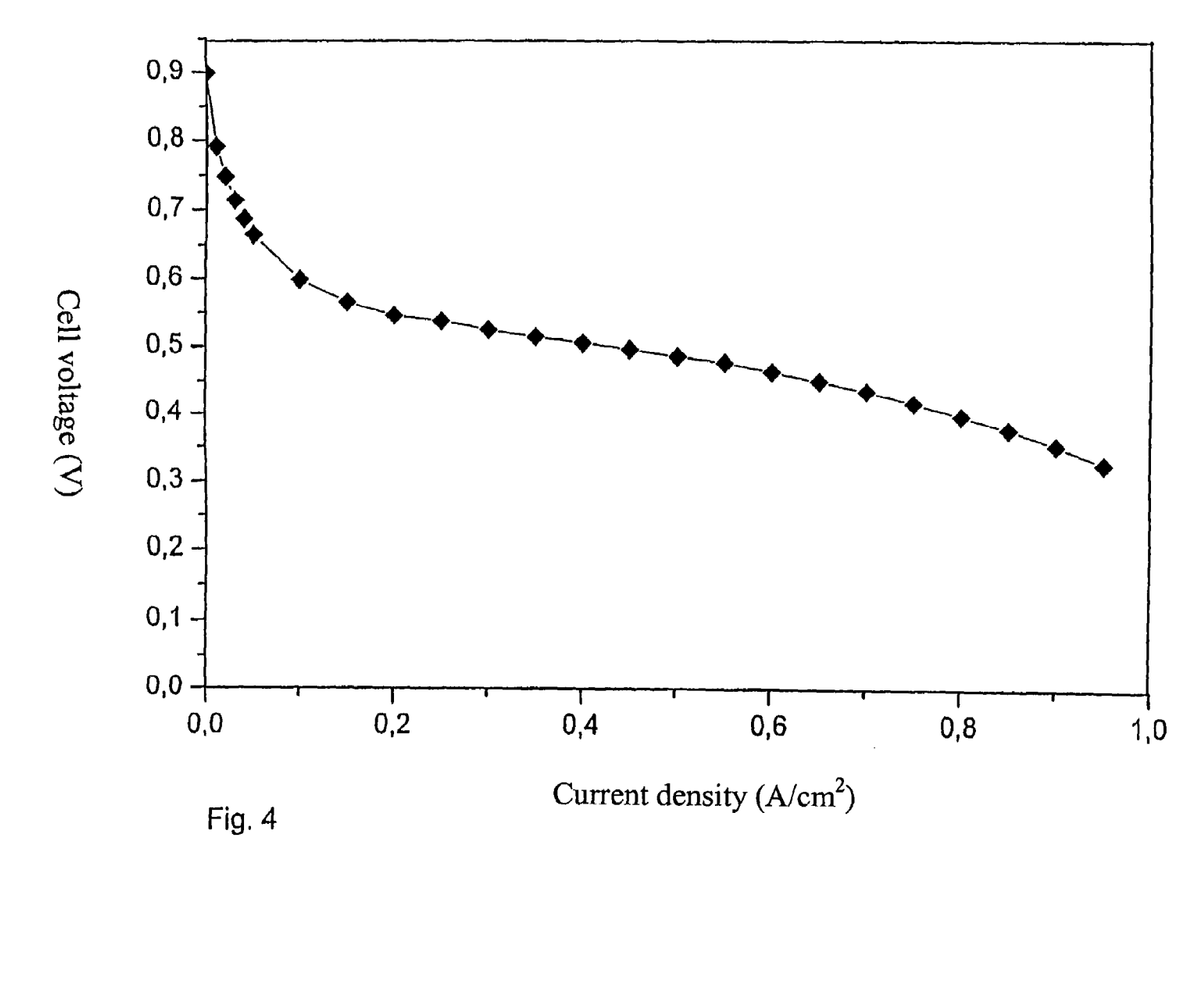
FIG. 4 shows a current-voltage curve for an MEA produced according to Example 3 at 60° C.

Power Parameters at 60° C.:

FIG. 4 shows a current-voltage curve for an MEA produced according to Example 3 at 60° C. The gas flow for $H_2$ was 170 mL/min and for air was 570 mL/min. The power parameters were determined on an FCATS Advanced Screener from the company Hydrogenics Corporation, Canada.

The $H_2$ permeability through the membrane was 0.0054 $m^3_N/(m^2 \cdot h \cdot bar)$ at 60° C., measured with an $H_2$ sensor from Dräger Safety AG & Co. KGaA.

Example 6

Producing the Doped Membrane:

47.8 g polybenzimidazole (PBI) with an intrinsic viscosity** of 0.86 dL/g is dissolved in 191 g N,N-dimethyl acetamide (manufacturer: Sigma Aldrich) by boiling for three hours at a temperature of 200° C. in a pressurized reactor. The cooled solution is mixed while stirring at room temperature with 2.5 g butanediol diglycidyl ether and then with 10.4 g di-(2-ethylhexyl) phosphoric acid ester. Then the solution is heated for 1 hour at 100° C. while stirring to obtain a homogeneous solution. After filtration and degassing the solution, membranes are produced by technical machine drawing and then dried for four hours at 200° C.

**The viscosity was determined by means of a 1 wt % solution of PBI in N,N-dimethyl acetamide. From this intrinsic viscosity, an average molecular weight of the PBI of 55,700 g/mol can be calculated by using the Mark-Houwink equation.

A membrane produced as described above has an average thickness of 45 μm and is doped with 22 wt % di-(2-ethylhexyl) phosphoric acid ester, based on the total weight of the dry membrane.

Example 7

Producing a Membrane Electrode Assembly (MEA) with the Membrane from Example 6:

For the production of a membrane electrode assembly (MEA), a membrane produced according to Example 1 [sic; 6] is cut into square pieces measuring approximately 104 $cm^2$. Commercially available ELAT electrodes with 2.0 $mg/cm^2$ Pt coverage and an area of 50 $cm^2$ from the company E-TEK are impregnated in vacuo with concentrated phosphoric acid at room temperature and then installed with a membrane according to this invention in a conventional arrangement in the test fuel cell from the company Fuel Cell Technologies, Inc. The cell is sealed with a contact pressure of 6 MPa. At 160° C. and 3.5 bar hydrogen pressure and air pressure, a maximum power density of 0.6 $W/cm^2$ and a current density of approximately 1.6 $A/cm^2$ are obtained. Unmoistened gases are used.

Example 8

Figure 5:
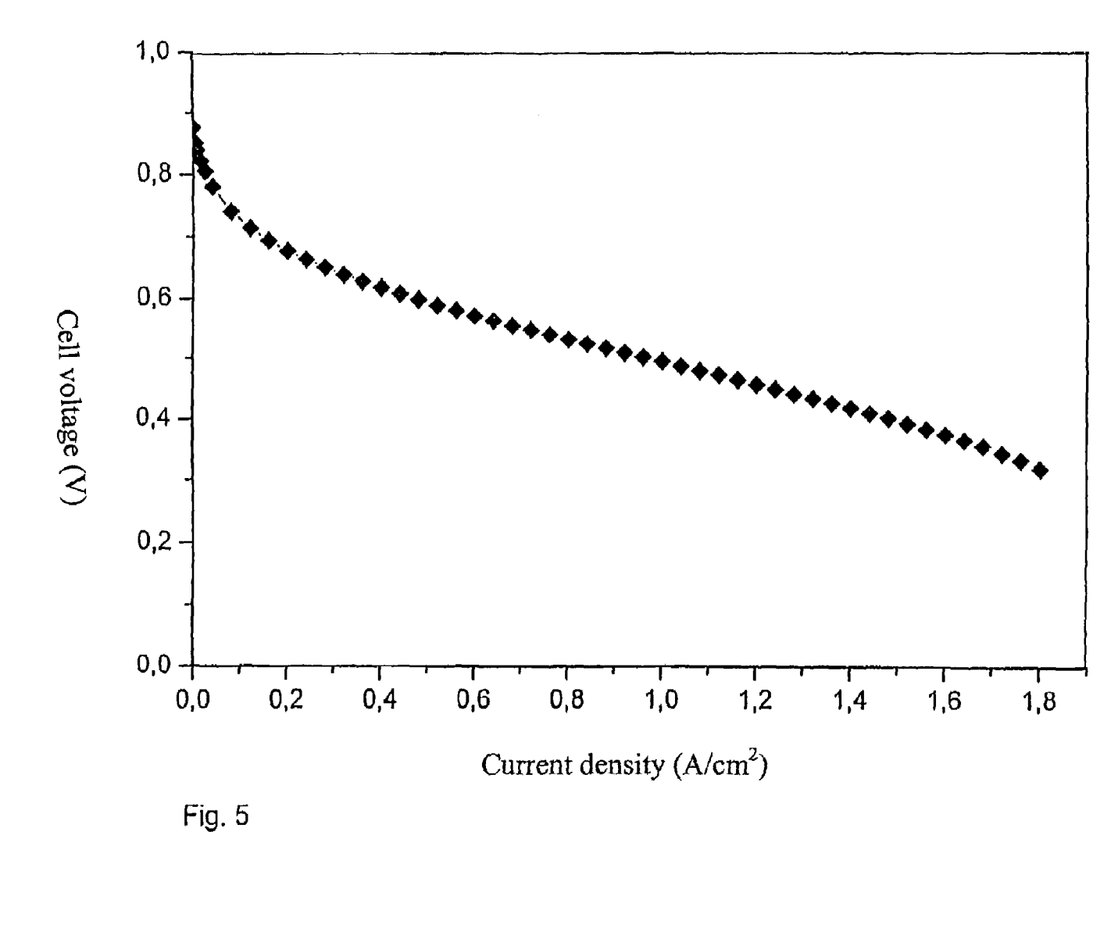
FIG. 5 shows the plot of a current-voltage curve for an MEA produced according to Example 7 at 160° C.

Power Parameters at 160° C. of MEA from Example 7:

FIG. 5 shows the plot of a current-voltage curve for an MEA produced according to Example 7 at 160° C. The gas flow for $H_2$ was 1400 mL/min and for air was 4580 mL/min. The power parameters were determined on an FCATS Advanced Screener from Hydrogenics Corporation, Canada.

Example 9

Figure 6:
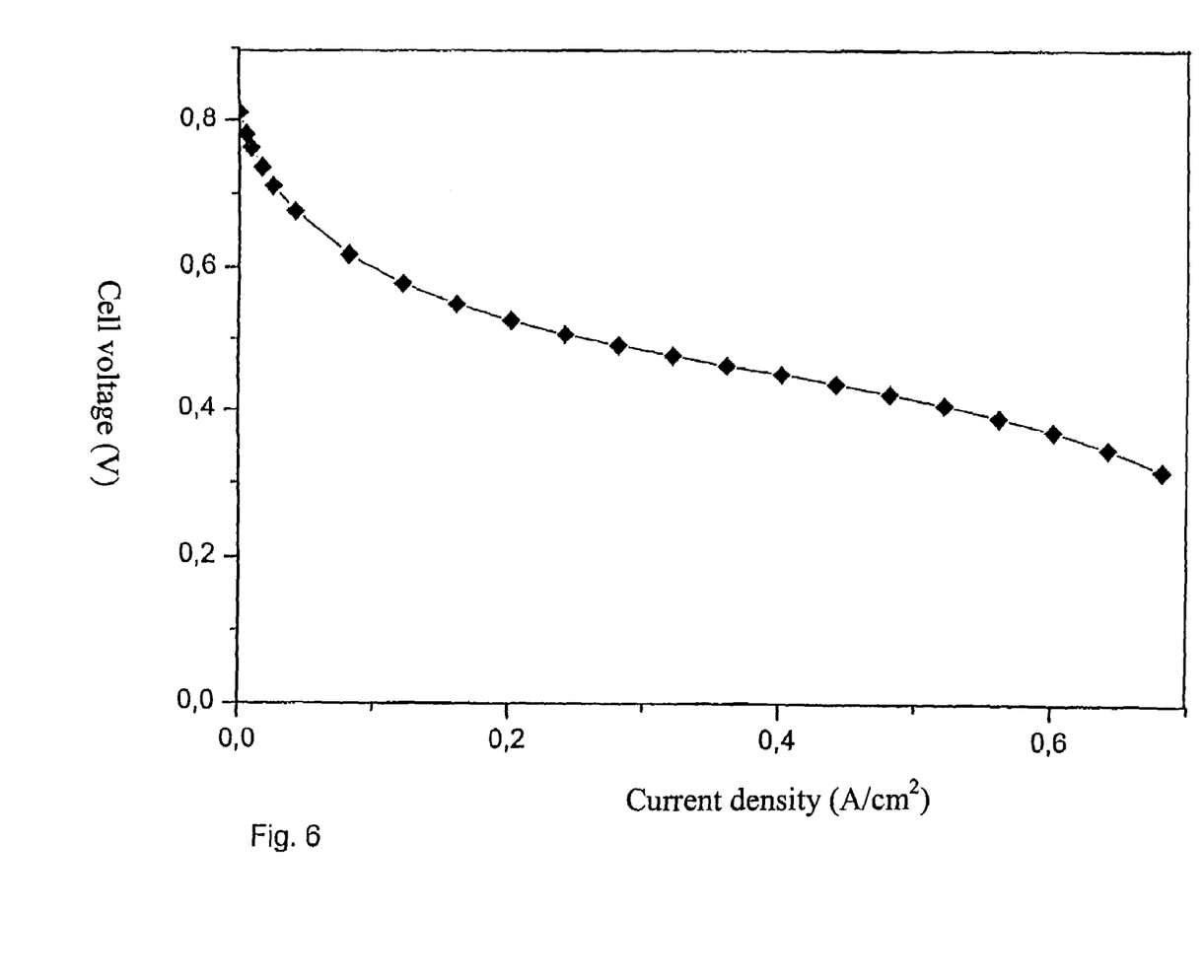
FIG. 6 shows the plot of a current-voltage curve for an MEA produced according to Example 7 at 60°.

Power Parameters at 60° C. of MEA from Example 7:

FIG. 6 shows the plot of a current-voltage curve for an MEA produced according to Example 7 at 60° C. The gas flow for $H_2$ was 910 mL/min and for air was 2900 mL/min. The power parameters were determined on an FCATS Advanced Screener from Hydrogenics Corporation, Canada.

What is claimed is:

1. Proton-conducting electrolyte membrane having a high conductivity, high mechanical and chemical stability, high flexibility and thermal stability which can be used over a wide temperature range, comprising at least one base material and at least one dopant, wherein the dopant is a reaction product of an at least dibasic inorganic acid with an organic compound, said reaction product having one acidic hydroxyl group, or the condensation product of said organic compound with a polybasic inorganic acid, wherein the dopant is added to the base material prior to formation of the proton-conducting electrolyte membrane, and wherein the membrane contains the dopant in a concentration of 10 to 40 wt %, based on the total weight of the dried doped membrane.

2. Membrane as claimed in claim 1, wherein the base material contains one or more polymers and/or one or more ceramic materials.

3. Membrane as claimed in claim 1 or 2, wherein the at least one base material is a basic polymer selected from the group comprising polybenzimidazole, polypyridine, polypyrimidine, polyimidazoles, polybenzothiazoles, polybenzoxazoles, polyoxadiazoles, polyquinoxalines, polythiadiazoles and poly(tetrazapyrenes) or a combination of two or more thereof.

4. Membrane as claimed in claim 3, wherein the basic polymer is polybenzimidazole.

5. Membrane as claimed in claim 1 or 2, wherein the at least dibasic inorganic acid for producing the dopant is selected from the group consisting of phosphoric acid and sulfuric acid.

6. Membrane as claimed in claim 1 or 2, wherein the at least dibasic inorganic acid is phosphoric acid.

7. Membrane as claimed in claim 1 or 2, wherein the organic compound for producing the dopant is selected from the group comprising linear or branched, substituted or unsubstituted aliphatic alcohols with 5 to 20 carbon atoms, substituted or unsubstituted aromatic alcohols, linear or branched, substituted or unsubstituted aliphatic amines with 5 to 20 carbon atoms and aromatic amines.

8. Membrane as claimed in claim 1 or 2, wherein the organic compound for producing the dopant is a linear or branched aliphatic alcohol or an aromatic alcohol.

9. Membrane as claimed in claim 1 or 2, wherein the organic compound is 2-ethylhexanol or phenol.

10. Membrane as claimed in claim 1 or 2, wherein the dopant is di-(2-ethylhexyl) phosphoric acid ester or diphenyl phosphoric acid ester.

11. Membrane as claimed claim 3, wherein the basic polymer is crosslinked.

12. Membrane as claimed in claim 1 or 2, wherein the dopant is insoluble in water.

13. Membrane as claimed in claim 1 or 2, wherein the electrolyte membrane has a thickness of 10 to 200 μm.

* * * * *